March 27, 1934.　　A. WARMISHAM　　1,952,522
OPTICAL PROJECTION APPARATUS
Filed March 29, 1932　　2 Sheets-Sheet 1
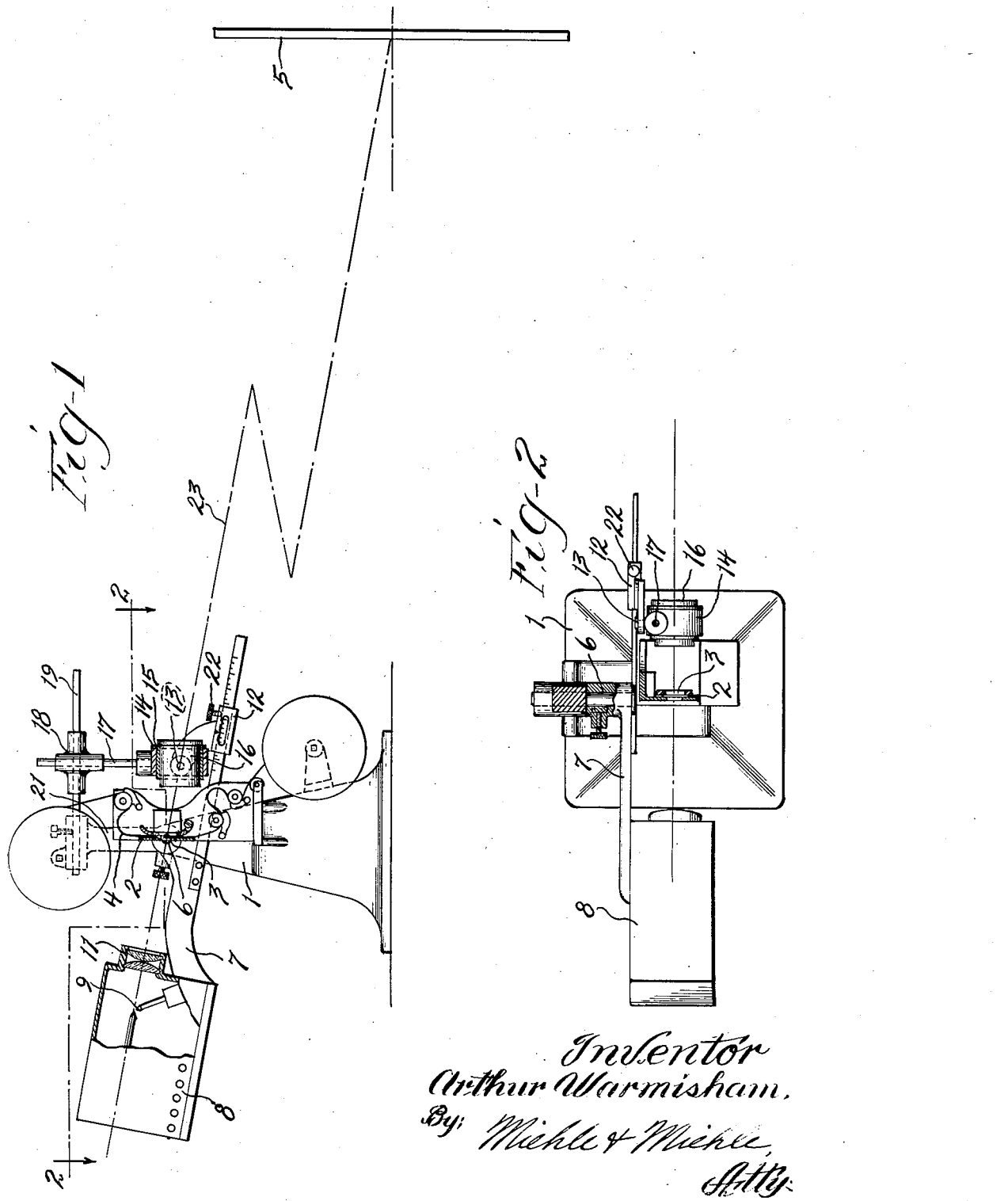

March 27, 1934.    A. WARMISHAM    1,952,522
OPTICAL PROJECTION APPARATUS
Filed March 29, 1932    2 Sheets-Sheet 2
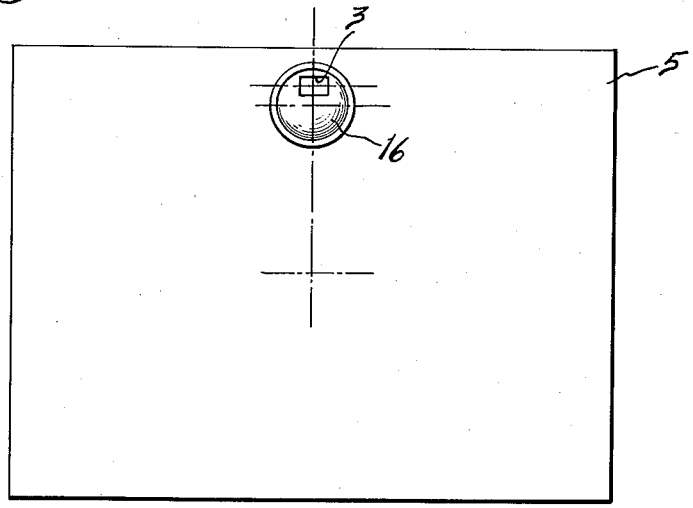
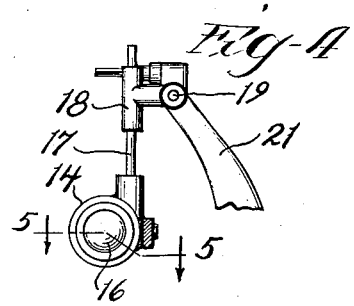
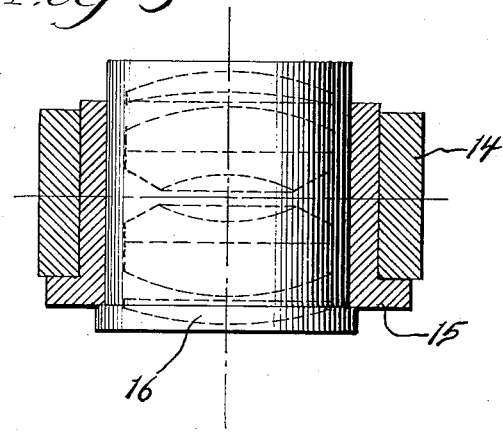
Inventor.
Arthur Warmisham.
By Miehle & Miehle,
Attys Patented Mar. 27, 1934

1,952,522

UNITED STATES PATENT OFFICE 1,952,522

OPTICAL PROJECTION APPARATUS

Arthur Warmisham, Evanston, Ill., assignor to The Bell & Howell Company, Chicago, Ill., a corporation of Illinois Application March 29, 1932, Serial No. 601,812

2 Claims. (Cl. 88—24)

My invention relates particularly to motion picture projection apparatus, although not limited to motion picture projection.

It is a common condition in motion picture theatres that the projecting machine is placed considerably above the main floor and projection screen and that the projection screen is necessarily disposed in a plane to afford a good view from the main floor of the theatre. Consequently, the projecting machine is tilted to project the pictures downwardly upon the screen with the screen disposed at an angle to the plane of the projection aperture of the projecting machine, which results in objectionable picture projection particularly in that the picture projected on the screen is distorted by an increase in its width toward its lower end, commonly referred to as "keystone".

My invention has for its main object the provision of apparatus whereby this "keystone" is eliminated or reduced.

The invention will be better understood by reference to the accompanying drawings in which—

Figure 1 is a side elevation of a motion picture projection system embodying my invention;

Figure 2 is a sectional view of the projecting machine substantially on the line 2—2 of Figure 1;

Figure 3 is a diagrammatic view normal to the projection screen showing the relative positions of the projection aperture and projection lens of the projecting machine and the projection screen;

Figure 4 is a view in front elevation of a portion of the projection machine; and Figure 5 is an enlarged partial section on the line 5—5 of Figure 4.

Like characters of reference indicate like parts in the several views.

Referring to the drawings, 1 designates generally a projecting machine, which is inclusive of a vertical film guide 2 provided with a projection aperture 3 across which a picture bearing film 4 is intermittently fed for the projection of pictures upon a projection screen 5 spaced from the projecting machine. See Figures 1 and 2.

Intermediately pivoted on the frame of the projecting machine on a transverse axis disposed intermediate the top and bottom of the projection aperture 3, by means of a suitable frictional pivot connection 6, and extending forwardly and rearwardly of the plane of the projection aperture 3, is a support member 7. On the rear end of the support member 7 is carried a lamp house 8 in which is disposed an arc lamp 9 from which projection light passes through a condenser 11 on the lamp house and the aperture 3 and film 4 in the guide 2 for the projection of pictures from the film.

Slidably mounted for adjustment on the forward portion of the member 7 is a member 12 upon which is pivotally mounted, as designated at 13, a bored lens carrier 14 in which is carried, by means of an adapter bushing 15, a projection lens 16 of a suitable wide angle anastigmatic type.

The lens 16 is maintained in position with its axis normal to the plane of the projection aperture by means of a vertical rod 17 secured on the lens carrier 14 and slidably engaged in a bore through a member 18 and a horizontal forwardly and rearwardly extending rod 19 secured on an upwardly extending arm 21 of the projecting machine frame and slidably engaged in another bore of the member 18.

Thus, the lens 16 is maintained with its axis normal to the plane of the projection aperture 3 in the adjusted positions of the member 7 and adjustment of the member 12 along the member 7 for focusing the lens, a clamp screw 22 being provided on the member 12 for adjustably positioning the member 12 along the member 7.

The arrangement is such that, by pivotal adjustment of the support member 7 on the pivot mounting 6, the projection lens 7 is adjustably positioned, in a direction corresponding with the plane of the projection aperture 3, eccentrically of the projection aperture, that is, its axis is spaced downwardly from the center of the projection aperture and normal to the plane thereof, and that, simultaneously with adjusting movement of the projection lens, the lamp house 8 and with it the arc lamp 9 and the condenser 11 is adjusted in correspondence with the plane of the projection aperture in a direction opposite the corresponding movement of the projection lens, thus providing a projection light axis, designated at 23 in Figure 1, disposed at an adjusted angle to the normal of the plane of the projection aperture and directed through the center of the entrance pupil of the projection lens.

Thus, where the projection screen has its center spaced downwardly from the center of the projection aperture, as shown in Figures 1 and 3, the support member 7 is adjusted so that the projection light axis centers on the projection screen 5, as shown in Figure 1, and the projection screen being disposed parallel to the projection aperture, the aforesaid "keystone" is prevented, and the projection lens having its axis normal to the planes of the projection aperture and screen, the entire area of the screen may be brought into sharp focus by adjustment of the projection lens along the projection light axis, by adjustment of the member 12 along the front portion of the support member 7 which is parallel with the projection light axis.

Due to inherent limitations of the projection lens, the angle to which the projection light axis may be adjusted is limited, and in extreme cases the projection aperture and projection screen may be slightly out of parallel relation, under which conditions "keystone" and lack of uniform focus is present to a small but not objectionable extent.

While I have described and shown the preferred embodiment of my invention, I do not wish to be limited to the precise details of construction as changes may readily be made without departing from the spirit of my invention, but having thus described my invention, I claim as new and desire to secure by Letters Patent the following.

1. In an optical projector the combination with a projection aperture, of means providing a projection light, a projection lens, and means whereby said light means and said projection lens are simultaneously adjustable with reference to said aperture in correspondence and in opposite directions corresponding with the plane of said aperture to provide a projection light axis disposed at an adjusted angle to the normal of the plane of said aperture and to adjustably position said projection lens in correspondence with the light axis with the lens axis normal to the plane of said aperture and spaced from the center of said aperture for the passage of said light axis through the center of its entrance pupil.

2. In an optical projector the combination with a projection aperture, of means providing a projection light, a projection lens, an intermediately pivoted member extending forwardly and rearwardly of the plane of said projection aperture, and carrying said light means rearwardly thereon, a member carrying said lens for pivotal movement and mounted forwardly on said pivoted member for adjustment therealong, and means whereby said lens is maintained normal to the plane of said aperture in pivotal adjustment of said intermediately pivoted member and adjustment of said lens carrying member.

ARTHUR WARMISHAM.